United States Patent
Nagayama

(10) Patent No.: US 7,137,669 B2
(45) Date of Patent: Nov. 21, 2006

(54) VEHICLE SEAT

(75) Inventor: Masaki Nagayama, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 56 days.

(21) Appl. No.: 11/095,148

(22) Filed: Mar. 31, 2005

(65) Prior Publication Data
US 2005/0231010 A1    Oct. 20, 2005

(30) Foreign Application Priority Data
Mar. 31, 2004    (JP)    ............... 2004-105598

(51) Int. Cl.
A47C 7/02    (2006.01)
(52) U.S. Cl. .................. 297/452.49; 297/452.54; 297/452.52; 297/216.1
(58) Field of Classification Search .......... 297/452.49, 297/452.52, 452.54, 452.15, 216.1; 5/230, 5/246; 267/80
See application file for complete search history.

(56) References Cited

U.S. PATENT DOCUMENTS 3,992,059 A * 11/1976 Kloepfer ................ 297/452.52
4,682,763 A * 7/1987 Kazaoka et al. ............... 267/89
4,969,687 A * 11/1990 Higuchi et al. ......... 297/452.18
5,088,793 A * 2/1992 Mithuhiro ............... 297/452.52
5,499,863 A * 3/1996 Nakane et al. ........... 297/452.2
6,116,694 A * 9/2000 Bullard ................... 297/452.52
6,412,874 B1 * 7/2002 Mayer .................... 297/452.52
6,663,178 B1 * 12/2003 Fourrey et al. ........... 297/284.3
6,773,069 B1 * 8/2004 Kaneko et al. ......... 297/344.17

* cited by examiner

Primary Examiner—Peter M. Cuomo
Assistant Examiner—Erika Garrett
(74) Attorney, Agent, or Firm—Dann, Dorfman, Herrell and Skillman, P.C.

(57) ABSTRACT

A vehicle seat includes a seat cushion which has a frame structure and a cushion member combined with the frame structure, the frame structure including a pair of spaced apart side frame members, a front frame member fixed to forward end portions of the side frame members, a connecting shaft extending between rearward end portions of the side frame members and interconnecting the rearward end portions of the side frame members, a plurality of zigzag springs stretched between the front frame member and the connecting shaft, the cushion member being laid on the zigzag springs, and retainers mounted on the connecting shaft, the zigzag springs being engaged at one terminals thereof with the retainer.

36 Claims, 6 Drawing Sheets

VEHICLE SEAT

FIELD OF INVENTION

The present invention relates to a vehicle seat and, more particularly, to a vehicle seat including a seat cushion which comprises a frame structure, a plurality of zigzag springs stretched in the frame structure, and a cushion member supported to the frame structure so as to be laid on the zigzag springs, and combined with the frame structure.

BACKGROUND OF THE INVENTION

As a conventional vehicle seat, there has been proposed a vehicle seat which includes a seat cushion, a seat track mechanism for allowing the vehicle seat to be moved forward and rearward in a vehicle, and a mechanism for causing the seat cushion to rise and fall in order to adjust a height of the vehicle seat. Japanese Patent Application Laid-Open No. 2002-142908 discloses the conventional vehicle seat. The seat cushion of the vehicle seat comprises a frame structure, a plurality of zigzag springs stretched in the frame structure, and a cushion member supported to the frame structure so as to be laid on the zigzag springs, and combined with the frame structure.

The frame structure is formed into a substantially quadrilateral ring-shape and comprises a pair of spaced apart side frame members, a first connecting shaft arranged between rear end portions of the spaced apart side frame members, and a front frame member fixed to forward end portions of the spaced apart side frame members. The zigzag springs are coupled at both terminals thereof to the front frame member and the first connecting shaft.

The seat track mechanism comprises a pair of parallel stationary rails spaced apart from each other and mounted on a floor of the vehicle through brackets, and a pair of parallel movable rails spaced apart from each other and slidably engaged with the stationary rails.

The mechanism for causing the seat cushion to rise and fall comprises linkage means provided between the movable rails and the side frame members of the frame structure. The linkage means comprises a pair of forward and rearward linkage bars connected at both ends thereof to each of the movable rails and each of the side frame members. More particularly, the forward linkage bar is pivotally supported at one end thereof through a first support pin to a portion of a corresponding movable rail which is adjacent a forward end portion of the corresponding movable rail, and supported at the other end thereof through a second support pin to a portion of a corresponding side frame member which is adjacent the front frame member. A second connecting shaft is arranged between forward linkage bars connected through second support pins to the side frame members, and coupled at both ends thereof to the second support pins. The rearward linkage bar is pivotally supported at one end thereof through a third support pin to a portion of a corresponding movable rail which is adjacent a rearward end portion of the corresponding movable rail, and supported at the other end thereof through a fourth support pin to a rear end portion of a corresponding side frame member of the frame structure. The first connecting shaft is arranged between rearward linkage bars connected through fourth support pins to the side frame members, and coupled at both ends thereof to the fourth support pins and the rearward end portions of the side frame members.

The forward and rearward linkage bars are adapted to be actuated by a driving motor or an operating knob so as to be pivoted. When the forward and rearward linkage bars are pivoted in a predetermined direction by the driving motor or the operating knob so as to operatively stand up, the vehicle seat is lifted up. When the forward and rearward linkage bars are pivoted in the opposite direction so as to be operatively inclined, the vehicle seat falls.

In a case where each of the zigzag springs is coupled at a rear terminal thereof directly to the first connecting shaft, when the first connecting shaft is moved as the linkage members are pivoted and the seat cushion rises, the rear terminal of the zigzag spring is wound around the first connecting shaft, whereby the zigzag spring may be twisted and irrecoverably deformed. Furthermore, it take a lot of labor to couple the rear terminals of the zigzag springs directly to the first connecting shaft by welding for example. In order to overcome the problems, the rear terminals of the zigzag springs of the conventional vehicle seat are coupled to the first connecting shaft through retainers.

Referring now to FIGS. 1 and 2, the conventional vehicle seat will be discussed in greater detail hereinafter in order to facilitate understanding of the present invention. In the conventional vehicle seat, a round pipe is employed as the first connecting shaft J of the frame structure. The zigzag springs S (only one zigzag spring S is shown in FIGS. 1 and 2) are coupled at forward terminals thereof directly to the front frame member F of the frame structure, and coupled at rearward terminals thereof to the first connecting shaft J by substantially S-shaped retainers R (only one retainer R is shown in FIGS. 1 and 2). Each of the retainers R comprises a first substantially C-shaped section $r_1$ and a second substantially C-shaped section $r_2$ continuing from the first C-shaped section $r_1$. First substantially C-shaped sections $r_1$ of the retainers R are rotatably mounted on the first connecting shaft J. The rearward terminals of the zigzag springs S are hooked on second substantially C-shaped sections $r_2$ of the retainers R.

The rearward terminal of each of the zigzag springs S is merely hooked on a corresponding retainer R and supported to the retainer R at one point thereof, so that when a person P sits on the vehicle seat and a weight load of the person P is then applied to the seat cushion, the retainers R are rotated around the first connecting shaft J in a clockwise direction while being pulled downwardly at the second substantially C-shaped sections $r_2$ thereof as shown in FIG. 2. Therefore, when compared with zigzag springs coupled at rearward terminals thereof directly to the first connecting shaft, the zigzag springs coupled at the rearward terminals thereof to the first connecting shaft through the retainers are considerably flexed downwardly as the retainers R are rotate in the clockwise direction while being pulled downwardly. The downward flexing of the zigzag springs deteriorates a cushioning condition of the seat cushion.

Furthermore, the retainers R are each formed into a substantially S-shape, so that each time the weight load of the person is applied to the seat cushion, the retainers R are drawn downwardly by the weight load and gradually deformed. As a result, when the person sits on the vehicle seat several times, the retainers R are irrecoverably deformed.

SUMMARY OF THE INVENTION

The present invention has been made with a view to overcoming the foregoing problems of the prior art vehicle seat.

It is therefore an object of the present invention to provide a vehicle seat in which a cushioning condition of a seat cushion can be kept constant.

It is another object of the present invention to provide a vehicle seat in which a plurality of zigzag springs can be easily and positively coupled to a frame structure for a seat cushion through retainers which will not deteriorate a cushioning condition of the seat cushion.

In accordance with one aspect of the present invention, there is provided a vehicle seat 1 including a seat cushion which has a frame structure and a cushion member combined with the frame structure. The frame structure comprises a pair of spaced apart side frame members, the side frame members having forward and rearward end portions, a front frame member fixed to the forward end portions of the side frame members, a connecting shaft extending between the rearward end portions of the side frame members and interconnecting the rearward end portions of the side frame members, a plurality of zigzag springs stretched between the front frame member and the connecting shaft, the cushion member being laid on the zigzag springs, each of the zigzag springs having first and second terminals, the first terminal being coupled to the front frame member, the second terminal being formed into a substantially U-shape in outline and comprising first and second spaced apart axial portions and an intermediate axial portion interconnecting the first and second axial portions, and a plurality of retainers for coupling second terminals of the zigzag springs to the connecting shaft therethrough. Each of the retainers comprises a substantially U-shaped body in cross-section, a first spring-receiving section extending laterally from one end of the U-shaped body, and a second spring-receiving section extending laterally from the other end of the U-shaped body. The U-shaped body of the each of the retainers is mounted on the connecting shaft with an opening thereof facing downward. The each of the zigzag springs is coupled at the second terminal thereof to a corresponding one of the retainers with the first axial portion and the second axial portion being engaged with a first spring-receiving section of the corresponding retainer and a second spring-receiving section of the corresponding retainer, respectively, and with an intermediate axial portion thereof being located under the connecting shaft and contacted with the connecting shaft.

The U-shaped body of the each of the retainers may be mounted on the connecting shaft so as to be rotatable with respect to the connecting shaft.

The retainer may be formed by bending a metal plate. The first spring-receiving section of the retainer is located inside the frame structure and extends horizontally. The second spring-receiving section of the retainer is located outside the frame structure and is bent into a substantially U-shape in cross-section.

The second axial portion of the second terminal is provided with an engaging axial portion extending laterally from a free end of the second axial portion, the engaging axial portion being engaged with an edge of the second spring-receiving section.

The vehicle seat may include a mechanism for causing the seat cushion to rise and fall in order to adjust a height of the vehicle seat.

The mechanism comprises a pair of spaced apart base members mounted on a floor of a vehicle, linkage means provided between the side frame members and the base members, and actuating means for actuating the linkage means.

In accordance with another aspect of the present invention, there is provided a retainer for coupling a zigzag spring to a frame structure for a seat cushion of a vehicle seat. The frame structure comprises a pair of spaced apart side frame members, the side frame members having forward and rearward end portions, a front frame member fixed to the forward end portions of the side frame members, and a connecting shaft extending between the rearward end portions of the side frame members and interconnecting the rearward end portions of the side frame members. The zigzag spring has first and second terminals. The first terminal of the zigzag spring is coupled to the front frame member. The second terminal of the zigzag spring is formed into a substantially U-shape in outline and comprises first and second spaced apart axial portions and an intermediate axial portion interconnecting the first and second axial portions. The retainer comprises a substantially U-shaped body in cross-section, a first spring-receiving section extending laterally from one end of the U-shaped body, and a second spring-receiving section extending laterally from the other end of the U-shaped body. The U-shaped body of the retainer is mounted on the connecting shaft with an opening thereof facing downward. The zigzag spring is coupled at the second terminal thereof to the retainer with the first axial portion and the second axial portion being engaged with the first spring-receiving section of the retainer and the second spring-receiving section of the retainer, respectively, and with an intermediate axial portion thereof being located under the connecting shaft and contacted with the connecting shaft.

In accordance with still another aspect of the present invention, there is provide a connecting structure for coupling a zigzag spring to a frame structure for a seat cushion of a vehicle seat. The frame structure comprises a pair of spaced apart side frame members, the side frame members having forward and rearward end portions, a front frame member fixed to the forward end portions of the side frame members, and a connecting shaft extending between the rearward end portions of the side frame members and interconnecting the rearward end portions of the side frame members. The zigzag spring has first and second terminals. The first terminal is coupled to the front frame member. The second terminal is formed into a substantially U-shape in outline and comprising first and second spaced apart axial portions and an intermediate axial portion interconnecting the first and second axial portions. The connecting structure comprises a retainer. The retainer comprises a substantially U-shaped body in cross-section, a first spring-receiving section extending laterally from one end of the U-shaped body, and a second spring-receiving section extending laterally from the other end of the U-shaped body. The U-shaped body of the retainer is mounted on the connecting shaft with an opening thereof facing downward. The zigzag spring is coupled at the second terminal thereof to the retainer with the first axial portion and the second axial portion being engaged with the first spring-receiving section of the retainer and the second spring-receiving section of the retainer, respectively, and with an intermediate axial portion thereof being located under the connecting shaft and contacted with the connecting shaft.

BRIEF DESCRIPTION OF THE DRAWINGS

These and other objects and many of the attendant advantages of the present invention will be readily appreciated as the same becomes better understood by reference to the following detailed description when considered in connection with the accompanying drawings, in which like reference characters designate like or corresponding parts throughout the Figures and wherein.

DETAILED DESCRIPTION OF THE INVENTION

Figure 1:
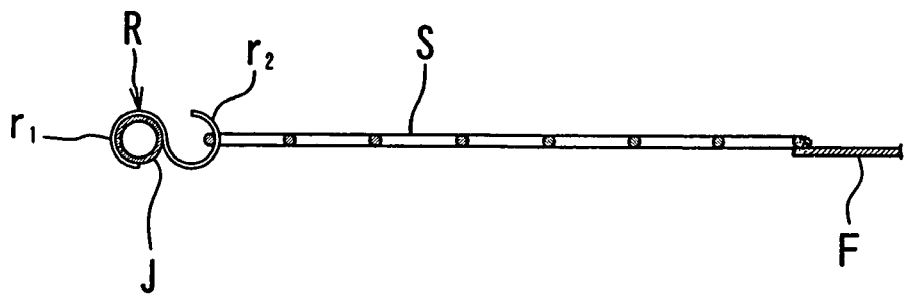
FIG. 1 is a schematic side view of assistance in explaining the structure for coupling the terminals of the zigzag springs to the frame structure of the seat cushion of the conventional vehicle seat.
Figure 2:
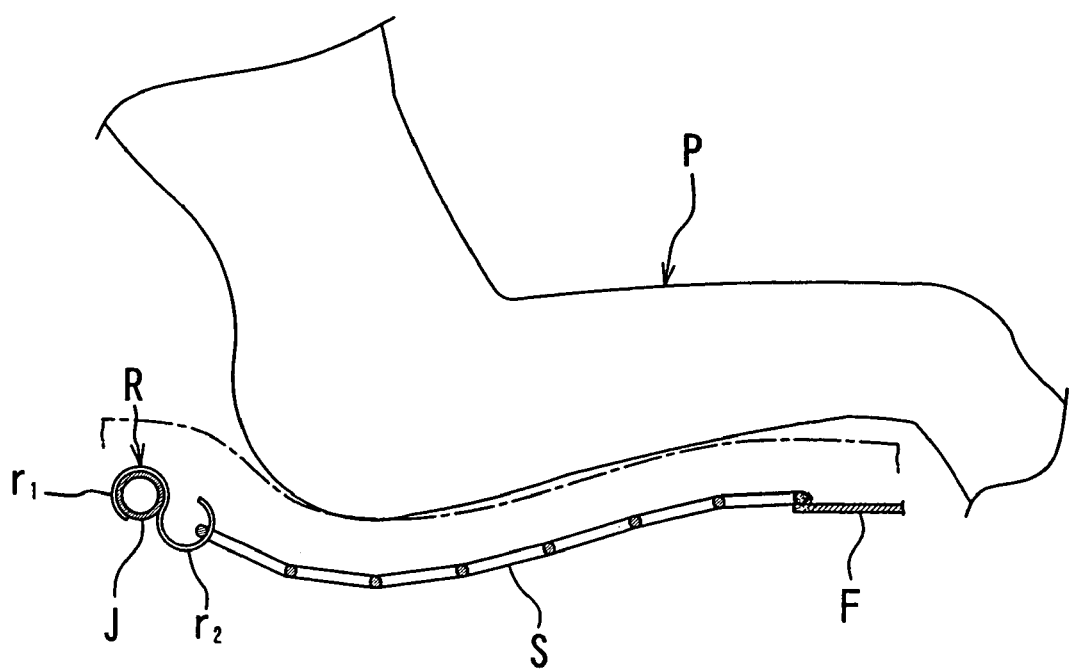
FIG. 2 is a schematic side view of assistance in explaining the condition of the zigzag springs at the time that the person sits on the conventional vehicle seat.
Figure 3:
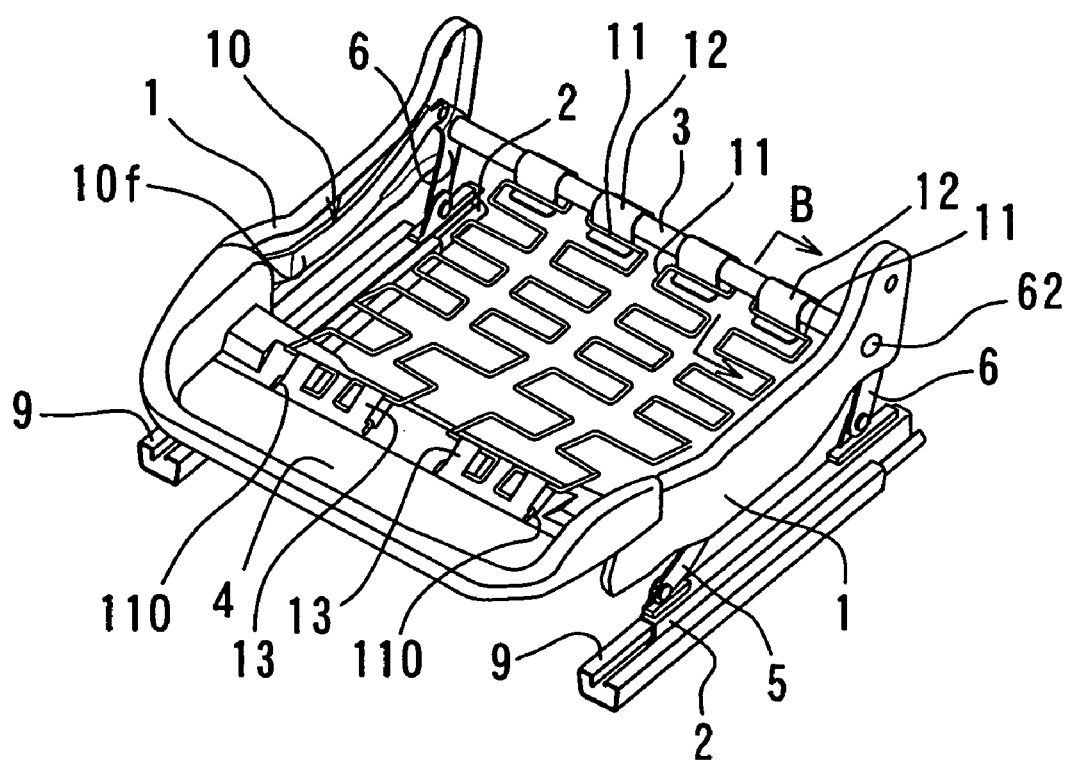
FIG. 3 is a schematic perspective view showing a frame structure for a seat cushion of a vehicle seat according to the present invention.
Figure 4:
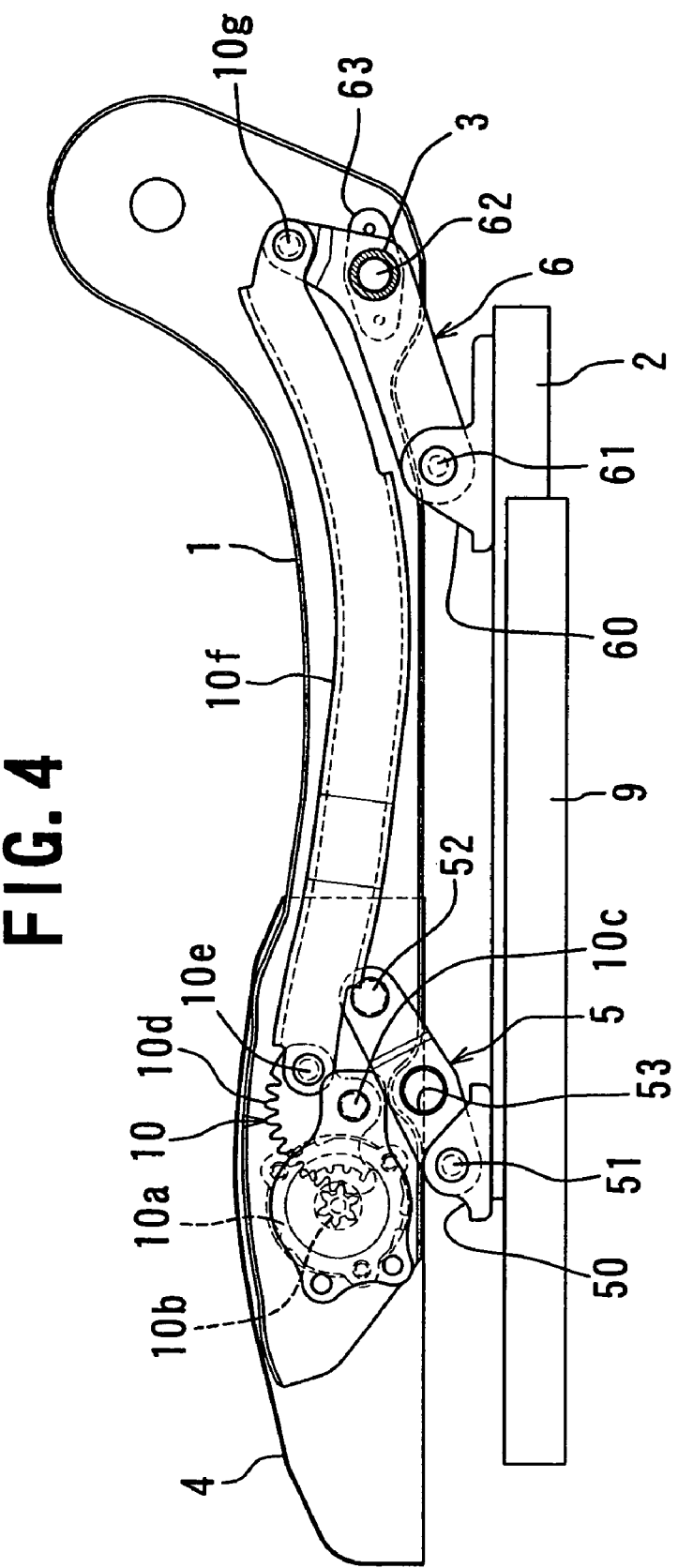
FIG. 4 is a schematic side view of one side of the frame structure of FIG. 3 as viewed from the inside.

Referring to FIGS. 3 and 4, there is illustrated a frame structure for a seat cushion of a vehicle seat according to the present invention. The frame structure is formed into a substantially quadrilateral ring-shape. More particularly, the frame structure comprises a pair of side frame members 1 spaced apart from each other, a first connecting shaft 3 arranged between rear end portions of the side frame members and interconnecting the rear end portions of the side frame members 1, and a pan frame member 4 fixed to forward end portions of the side frame members 1. A plurality of spaced apart zigzag springs 11 are stretched between the first connecting shaft 3 and the pan frame member 4.

Incidentally, though being not shown in FIGS. 3 and 4, a cushion member is to be supported on the frame structure so as to be laid on the zigzag springs 11, and is to be combined with the frame structure. As the first connecting shaft 3, there may be employed a round pipe.

In the illustrated example, the vehicle seat is adapted to be moved forward and rearward in a vehicle through a seat track mechanism. The seat tract mechanism comprises a pair of substantially parallel stationary rails 9 spaced apart from each other and mounted on a floor of the vehicle by brackets (not shown), and a pair of substantially parallel movable rails 2 engaged with the stationary rails 9 in slidable relationship with the stationary rails 9. Each of the movable rails 2 is provided with a pair of standing brackets 50, 60 which are spaced apart from each other and mounted to the movable rail 2.

In the illustrated example, the vehicle seat includes a mechanism for causing the seat cushion to rise and fall in order to adjust a height of the vehicle seat. The mechanism for causing the seat cushion to rise and fall comprises two pairs of linkage bars 5, 6 interconnecting the side frame members 1 and the movable rails 2, and actuating means 10 for actuating the first and second linkage bars 5, 6. More particularly, each of the side frame members 1 and each of the movable rails 2 are coupled to each other by a pair of spaced apart linkage bars 5, 6. The first linkage bar 5 is pivotally supported at a first end portion thereof to the first standing bracket 50 of a corresponding movable rail 2 by a first support pin 51. First linkage bars 5 which are coupled to first standing brackets 50 of the movable rails 2 and the side frame members 1 are coupled to each other by a second connecting shaft 53. The second linkage bar 6 is pivotally supported at a first end portion thereof to the second standing bracket 60 of a corresponding movable rail 2 by a second support pin 61. A second end portion of the first linkage bar 5 is connected to a corresponding side frame member 1 by a third support pin 52. The second linkage bar 6 extends rather than the first linkage bar 5 and is bent into a substantially L-shape. The second linkage bar 6 is connected at a substantially middle portion thereof to a corresponding side frame member 1 by a fourth support pin 62. Fourth support pins 62 penetrate the side frame members 1 from the outside, and project in the frame structure. Second linkage bars 6 are supported through washers 63 (only one washer 63 is shown in FIG. 4) to the fourth support pins 62 so as to allow inner end portions of the fourth support pins 62 to penetrate the second linkage bars 6. Both end portions of the first round pipe 3 are fitted on the inner end portions of the fourth support pins 62 and connected to the side frame members 1.

When the first linkage bars 5 and the second linkage bars 6 are pivoted around the first support pins 51 and the second support pins 61, respectively, by the actuating means, the frame structure rises or falls according to a pivotal direction of the first and second linkage bars 5, 6.

As shown in FIG. 4, the actuating means 10 comprises an operating knob 10a arranged outside the frame structure and having a rotating axis which penetrates a side of the pan frame member 4 and one of the side frame members 2 and projects in the frame structure, a pinion gear 10b mounted on an inner end portion of the rotating axis of the operating knob 10a, a sector gear 10d rotatably supported to the side frame member 2 by a fifth support pin 10c and meshed with the pinion gear 10b, and a rod 10f extending between the sector gear 10d and a corresponding second linkage bar 6. The rod 10f is supported at one end thereof to the sector gear 10d through a sixth support pin 10e, and connected at the other end thereof to a second end portion of the second linkage bar 6 by a seventh support pin 10g.

As discussed above, the zigzag springs 11 are stretched between the first connecting shaft 3 and the pan frame member 4. As shown in FIG. 3, spaced apart retainers 12 which correspond in number to the zigzag springs 11 are mounted on the first connecting shaft 3 so as to be rotatable with respect to the first connecting shaft 3. The zigzag springs 11 are coupled at rearward terminals thereof to the retainers 12 and coupled at forward terminals thereof to substantially arch-shaped engaging pieces 13 which are provided at the pan frame member 4 and correspond in number to the zigzag springs 11. The arch-shaped engaging pieces 13 are spaced apart from one another and disposed across the width of the pan frame member 4. More particularly, the engaging pieces 13 are formed by cutting portions of the pan frame member 4 and then causing the portions of the pan frame member 4 to be risen up from a surface of the pan frame member 4.

As shown in FIG. 3, a forward terminal of each of the zigzag springs 11 is formed into a substantially U-shape in outline and has an engaging portion 110 which is formed by causing a free end region of the U-shaped terminal to be bent perpendicularly to the U-shaped terminal. The forward terminal of each of the zigzag springs 11 is inserted through a space between a corresponding arch-shaped piece 13 and the surface of the pan frame member 4 with a central portion thereof being laid on the surface of the pan frame member 4, and with the engaging portion 110 being engaged with an edge of the arch-shaped piece 13.

Figure 5:
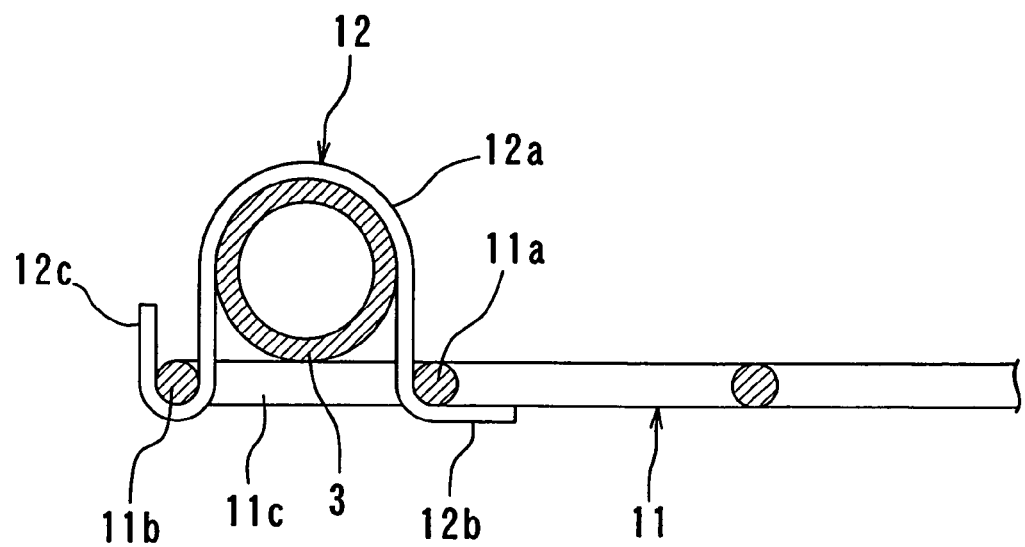
FIG. 5 is a fragmentary sectional view of the frame structure of FIG. 3, taken on a plane indicated in FIG. 3 by arrows B.
Figure 6:
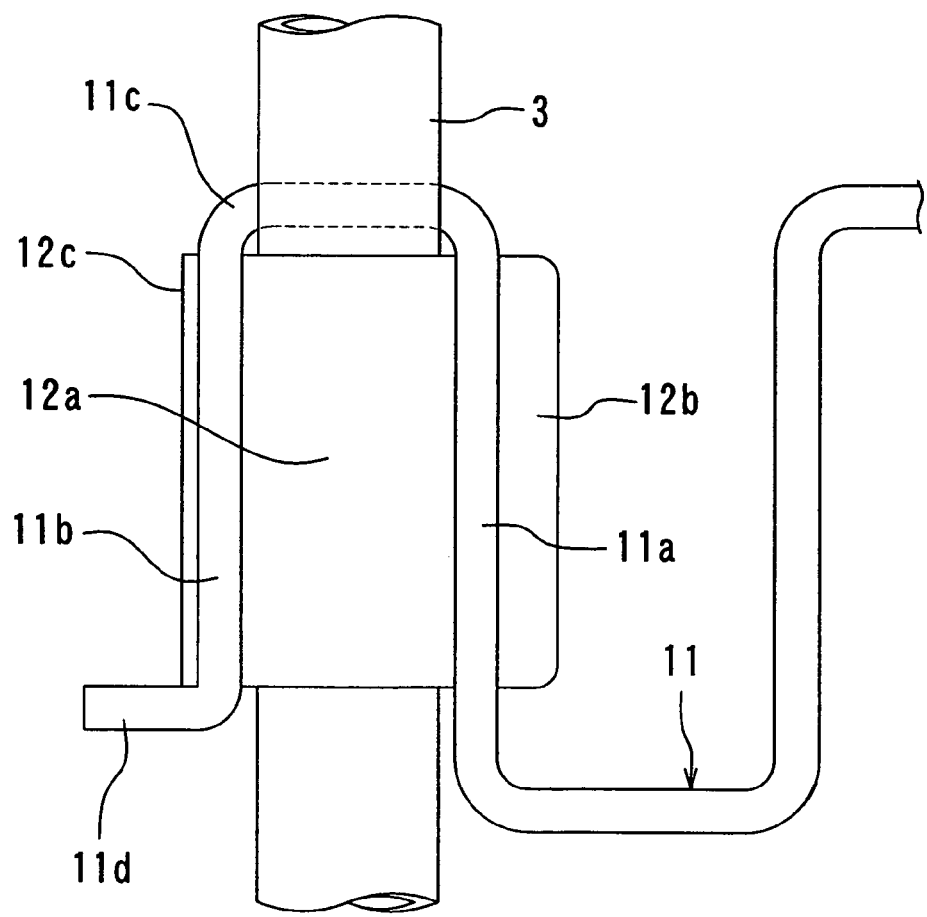
FIG. 6 is a schematic plan view of the frame structure of FIG. 5.

Referring to FIGS. 5 and 6, there is illustrated one of the retainers 12 and one of the zigzag springs 11. The retainer 12 comprises a body 12*a* of a substantially U-shape in cross-section mounted on the first connecting shaft 3 so as to be rotatable with respect to the first connecting shaft 3, and first and second spring-receiving sections 12*b*, 12*c* provided at both ends of the U-shaped body 12*a*. The first spring-receiving section 12*b* horizontally extends laterally from one end of the U-shaped body 12*a*. The second spring-receiving section 12*c* is formed into a substantially U-shape in cross-section and extends upwardly from the other end of the U-shaped body 12*b* with an opening thereof facing upwardly. In the illustrated example, the retainer 12 is formed by bending a metal plate. The retainer 12 is mounted on the first connecting shaft 3 with an opening of the U-shaped body 12*a* facing donwardly, with the first spring-receiving section 12*b* thereof being located inside the structure frame and with the second spring-receiving section 12*c* being located outside the frame structure.

The rearward terminal of each of the zigzag springs 11 is formed into a substantially U-shape in outline. More particularly, the rearward terminal of the zigzag spring 11 comprises a pair of spaced apart axial portions 11*a*, 11*b* and an intermediate axial portion 11*c* interconnecting the spaced apart axial portions 11*a*, 11*b*. The rearward terminal of the zigzag spring 11 is coupled to a corresponding retainer 12 with the first axial portion 11*a* thereof being engaged with the first spring-receiving section 12*b* of the retainer 12, with the second axial portion 11*b* thereof being received in and engaged with the second spring-receiving section 12*c*, and with the intermediate axial portion 11*c* thereof being located under the first connecting shaft 3. The intermediate axial portion 11*c* of the zigzag spring 11 is point-contacted with the first connecting shaft 3. Thus, the retainer 12 can be maintained in a posture in which the opening of the substantially U-shaped body 12*a* faces downward. In addition, the rearward terminal of the zigzag spring 11 can be easily and stably coupled to the first connecting shaft 3 through the corresponding retainer 12.

As shown in FIG. 6, the rearward terminal of the zigzag spring 11 further has an engaging axial portion 11*d* extending laterally from an end of the second axial portion 11*b* thereof. The engaging axial portion 11*d* of the zigzag spring 11 is engaged with an edge of the second spring-receiving section 12*c* of the corresponding retainer 12. Thus, the rearward terminal of the zigzag spring 11 can be securely coupled to the retainer 12.

Figure 7:
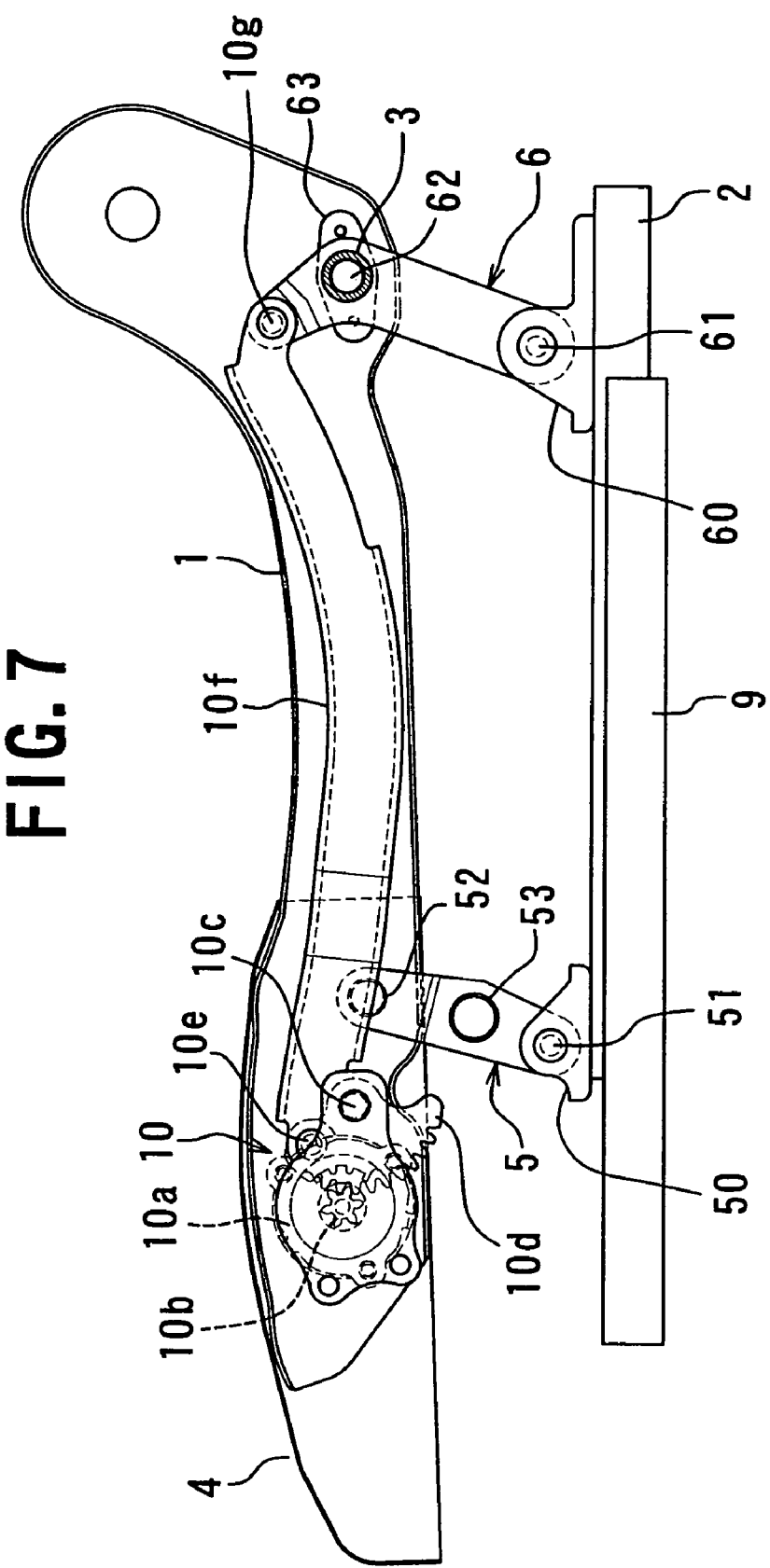
FIG. 7 is a schematic side view similar to FIG. 3 and of assistance in explaining a condition where the vehicle seat of the present invention is lift up.

Again referring to FIG. 4, and referring to FIGS. 7 to 9, the operation of the mechanism for causing the seat cushion to rise and fall will be discussed hereinafter. In a condition where the frame structure is located at a lower position as shown in FIG. 4, the first and second linkage bars 5, 6 are inclined rearward. In the condition of FIG. 4, when the rotating axis of the operating knob 10*a* is rotated in a clockwise direction, the pinion gear 10*b* is rotated in the same direction. As the pinion gear 10*b* is rotated in the direction, the sector gear 10*d* meshed with the pinion gear 10*b* is rotated in the opposite direction or in a counterclockwise direction, whereby the rod 10*f* is pulled forward. The forward pulling of the rod 10*f* causes the second linkage bars 6 to rotate around the support pins 61 so as to stand up, and then causes the first linkage bars 5 to rotate around the support pin 51 so as to stand up. Thus, the vehicle seat is lifted up as shown in FIG. 7.

Figure 8:
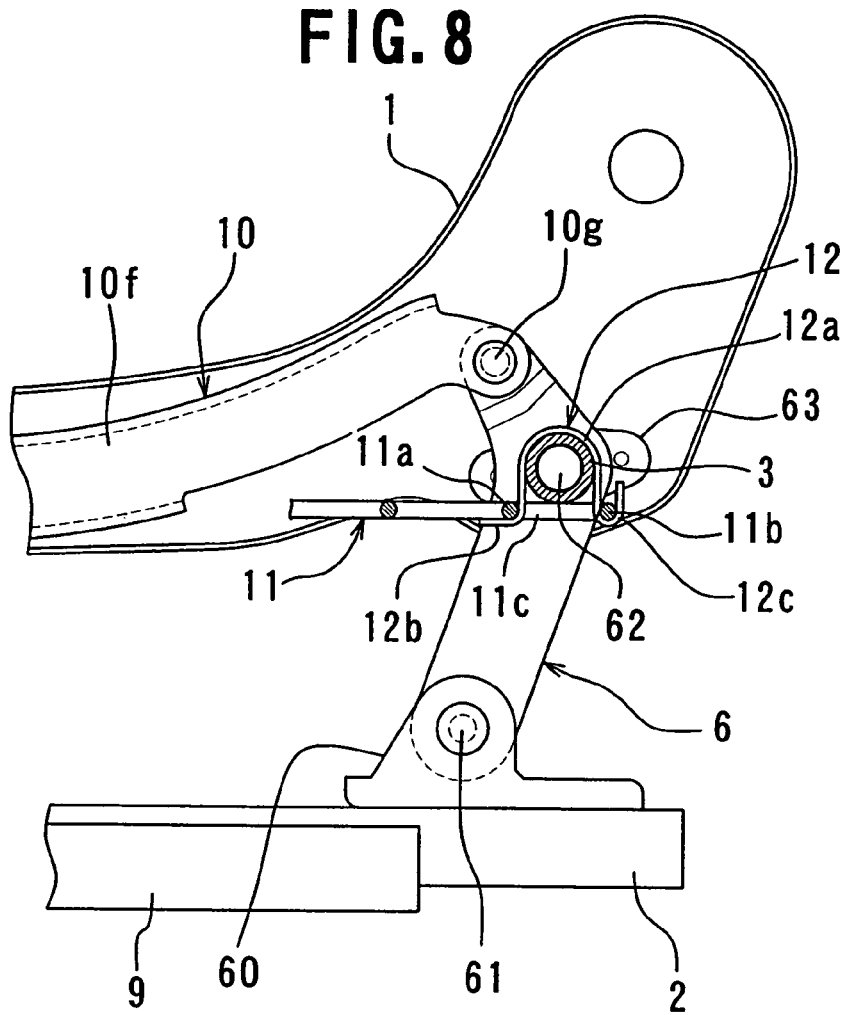
FIG. 8 is a fragmentary enlarged side view of the frame structure of FIG. 3.

The retainers 12 are rotatably mounted on the first connecting shaft 3 and engaged with the rearward terminals of the zigzag springs 11 as discussed above, so that even if the first connecting shaft 3 which interconnects the side frame members 1 is moved as the frame structure is lifted up, each of the retainers 12 on the first connecting shaft 3 is kept in the mounted condition in which the opening of the retainer 12 faces downward as shown in FIG. 8. Thus, an effective length of each of the zigzag springs 11 in the vehicle seat according to the present invention is kept constant because the rearward terminal of the zigzag spring 11 is not wound around the first connecting shaft 11 differently to the rearward terminal of a zigzag spring which is coupled directly to the first connecting shaft.

Figure 9:
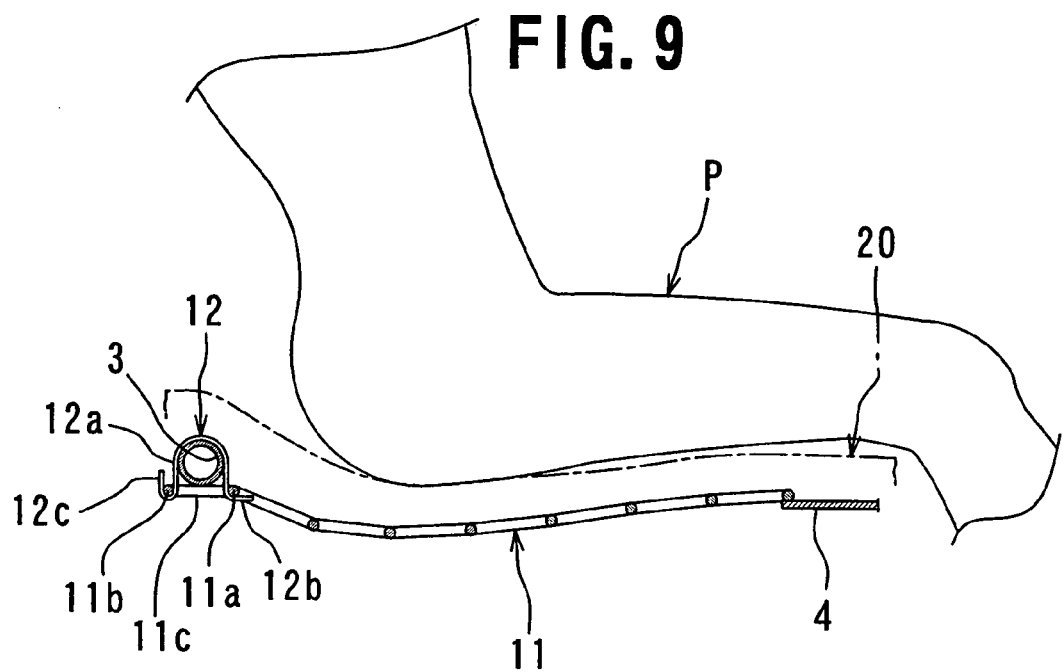
FIG. 9 is a schematic side view of assistance in explaining a condition of zigzag springs of the frame structure of FIG. 3 at the time that the person sits on the vehicle seat of the present invention.

Furthermore, when the person P sits on the vehicle seat and the weight load of the person P is then applied to the seat cushion to thereby cause the zigzag springs 11 to be flexed downward as shown in FIG. 9 (only one zigzag spring 11 is shown in FIG. 9), whereby the retainers 12 are pulled downward, the retainers 12 are not rotated and are maintained in the mounted conditions. More particularly, the retainers 12 are coupled to the zigzag springs 11 with the first spring-receiving portions 12*b* thereof being engaged with the first axial portions 11*a* of the zigzag springs 11, with the second spring-receiving portions 12*c* thereof being engaged with the second axial portions 11*b* of the zigzag springs 11. In addition, the intermediate axial portions 11*c* of the zigzag springs 11 are point-contacted with the first connecting shaft 3 as discussed above. Thus, the U-shaped bodies 12*a* of the retainers 12 are interposed between the first and second axial portions 11*a*, 11*b* of the zigzag springs 11, and the first connecting shaft 3 is interposed between the U-shaped bodies 12*a* of the retainers 12 and the intermediate axial portions 11*c* of the zigzag springs 11. Therefore, when the zigzag springs 11 are flexed downward as shown in FIG. 9, the first and second axial portions 11*a*, 11*b* of the zigzag springs 11 which are engaged with the first and second spring-receiving sections 12*b*, 12*c* of the retainers 12 are pulled downward whereby the retainers 12 are tightly fastened to the first connecting shaft 3. At this time, any torque to tend to rotate the retainers 12 with respect to the first connecting shaft 3 is not generated, so that the retainers 12 are not rotated with respect to the first connecting shaft 3 and maintained in the mounted conditions. Therefore, a downward flexing mount of each of the zigzag springs 11 is restricted, so that a cushioning condition of the seat cushion can be kept constant. In addition, an effective length of each of the zigzag springs 11 can be maintained constant differently to each of the zigzag springs of the conventional vehicle seat. Furthermore, differently to the retainers of the conventional vehicle seat, there is no possibility that the retainers 12 of the present invention will be deformed as the zigzag springs 11 are flexed downward. Therefore, according to the present invention, it is possible to provide a vehicle seat in which a cushioning condition of a seat cushion can be kept constant. Incidentally, a reference numeral 20 in FIG. 9 denotes the cushion member which is supported to the frame structure so as to be laid on the zigzag springs 11 and combined with the frame structure.

While the above description is made of the frame structure in which the round pipe-shaped connecting shaft is employed as a component constituting a rear section of the frame structure, this invention may be applied to a frame structure which comprises a U-shaped pipe member and a front frame member fixed to free ends of the U-shaped pipe member. The present invention may be also applied to a frame structure which a round pipe-shaped connecting shaft is employed in lieu of the pan frame member.

Furthermore, while the above description is made of the vehicle seat which includes the seat track mechanism and the mechanism for causing the seat cushion to rise and fall, the present invention may be applied to a vehicle seat which is not provided with such mechanisms. In a case where the present invention is applied to a vehicle seat which is provided with the mechanism for causing the seat cushion to rise and fall, but is not provided with the seat track mechanism, a pair of spaced apart base members which are mounted on a vehicle floor are employed in lieu of the stationary rails and the linkage means are provided between the side frame members and the base frame members.

The terms and expressions which have been employed are used as terms of description and not of limitation, and there is no intention in the use of such terms and expressions of excluding any equivalents of the features shown and described, or portions thereof, but it is recognized that various modifications are possible within the scope of the invention claimed.

What is claimed is:

1. A vehicle seat including a seat cushion which has a frame structure and a cushion member combined with said frame structure;
    said frame structure comprising:
    a pair of spaced apart side frame members;
    said side frame members having forward and rearward end portions;
    a front frame member fixed to said forward end portions of said side frame members;
    a connecting shaft extending between said rearward end portions of said side frame members and interconnecting said rearward end portions of said side frame members;
    a plurality of zigzag springs stretched between said front frame member and said connecting shaft;
    said cushion member being laid on said zigzag springs;
    each of said zigzag springs having first and second terminals;
    said first terminal being coupled to said front frame member;
    said second terminal being formed into a substantially U-shape in outline and comprising first and second spaced apart axial portions and an intermediate axial portion interconnecting said first and second axial portions; and
    a plurality of retainers for coupling second terminals of said zigzag springs to said connecting shaft therethrough;
    each of said retainers comprising a substantially U-shaped body in cross-section, a first spring-receiving section extending laterally from one end of said U-shaped body, and a second spring-receiving section extending laterally from the other end of said U-shaped body;
    said U-shaped body of said each of said retainers being mounted on said connecting shaft with an opening thereof facing downward; and
    said each of said zigzag springs being coupled at said second terminal thereof to a corresponding one of said retainers with said first axial portion and said second axial portion being engaged with a first spring-receiving section of said corresponding retainer and a second spring-receiving section of said corresponding retainer, respectively, and with an intermediate axial portion thereof being located under said connecting shaft and contacted with said connecting shaft.

2. A vehicle seat according to claim 1, wherein said U-shaped body of said each of said retainers is mounted on said connecting shaft so as to be rotatable with respect to the connecting shaft.

3. A vehicle seat according to claim 2, wherein said retainer is formed by bending a metal plate; wherein said first spring-receiving section of said retainer is located inside said frame structure and extends horizontally; and wherein said second spring-receiving section of said retainer is located outside said frame structure and bent into a substantially U-shape in cross-section.

4. A vehicle seat according to claim 3, wherein said second axial portion of said second terminal is provided with an engaging axial portion extending laterally from a free end of said second axial portion, said engaging axial portion being engaged with an edge of said second spring-receiving section.

5. A vehicle seat according to claim 4, further including a mechanism for causing said seat cushion to rise and fall in order to adjust a height of said vehicle seat.

6. A vehicle seat according to claim 5, wherein said mechanism comprises a pair of spaced apart base members mounted on a floor of a vehicle, linkage means provided between said side frame members and said base members, and actuating means for actuating said linkage means.

7. A vehicle seat according to claim 3, further including a mechanism for causing said seat cushion to rise and fall in order to adjust a height of said vehicle seat.

8. A vehicle seat according to claim 7, wherein said mechanism comprises a pair of spaced apart base members mounted on a floor of a vehicle, linkage means provided between said side frame members and said base members, and actuating means for actuating said linkage means.

9. A vehicle seat according to claim 2, further including a mechanism for causing said seat cushion to rise and fall in order to adjust a height of said vehicle seat.

10. A vehicle seat according to claim 9, wherein said mechanism comprises a pair of spaced apart base members mounted on a floor of a vehicle, linkage means provided between said side frame members and said base members, and actuating means for actuating said linkage means.

11. A vehicle seat according to claim 1, wherein said retainer is formed by bending a metal plate; wherein said first spring-receiving section of said retainer is located inside said frame structure and extends horizontally; and wherein said second spring-receiving section of said retainer is located outside said frame structure and bent into a substantially U-shape in cross-section.

12. A vehicle seat according to claim 11, wherein said second axial portion of said second terminal is provided with an engaging axial portion extending laterally from a free end of said second axial portion, said engaging axial portion being engaged with an edge of said second spring-receiving section.

13. A retainer for coupling a zigzag spring to a frame structure for a seat cushion of a vehicle seat,
    said frame structure comprising:
    a pair of spaced apart side frame members;
    said side frame members having forward and rearward end portions;
    a front frame member fixed to said forward end portions of said side frame members; and a connecting shaft extending between said rearward end portions of said side frame members and interconnecting said rearward end portions of said side frame members;

said zigzag spring having first and second terminals;

said first terminal being coupled to said front frame member;

said second terminal being formed into a substantially U-shape in outline and comprising first and second spaced apart axial portions and an intermediate axial portion interconnecting said first and second axial portions;

said retainer comprising a substantially U-shaped body in cross-section, a first spring-receiving section extending laterally from one end of said U-shaped body, and a second spring-receiving section extending laterally from the other end of said U-shaped body;

said U-shaped body of said retainer being mounted on said connecting shaft with an opening thereof facing downward; and said zigzag spring being coupled at said second terminal thereof to said retainer with said first axial portion and said second axial portion being engaged with said first spring-receiving section of said retainer and said second spring-receiving section of said retainer, respectively, and with an intermediate axial portion thereof being located under said connecting shaft and contacted with said connecting shaft.

14. A retainer according to claim 13, wherein said U-shaped body of said retainer is mounted on said connecting shaft so as to be rotatable with respect to the connecting shaft.

15. A retainer according to claim 14, wherein said retainer is formed by bending a metal plate; wherein said first spring-receiving section of said retainer is located inside said frame structure and extends horizontally; and wherein said second spring-receiving section of said retainer is located outside said frame structure and bent into a substantially U-shape in cross-section.

16. A retainer according to claim 15, wherein said second axial portion of said second terminal is provided with an engaging axial portion extending laterally from a free end of said second axial portion, said engaging axial portion being engaged with an edge of said second spring-receiving section.

17. A retainer according to claim 16, wherein said vehicle seat includes a mechanism for causing said seat cushion to rise and fall in order to adjust a height of said vehicle seat.

18. A retainer according to claim 17, wherein said mechanism comprises a pair of spaced apart base members mounted on a floor of a vehicle, linkage means provided between said side frame members and said base members, and actuating means for actuating said linkage means.

19. A retainer according to claim 15, wherein said vehicle seat includes a mechanism for causing said seat cushion to rise and fall in order to adjust a height of said vehicle seat.

20. A retainer according to claim 19, wherein said mechanism comprises a pair of spaced apart base members mounted on a floor of a vehicle, linkage means provided between said side frame members and said base members, and actuating means for actuating said linkage means.

21. A retainer according to claim 14, wherein said vehicle seat includes a mechanism for causing said seat cushion to rise and fall in order to adjust a height of said vehicle seat.

22. A retainer according to claim 21, wherein said mechanism comprises a pair of spaced apart base members mounted on a floor of a vehicle, linkage means provided between said side frame members and said base members, and actuating means for actuating said linkage means.

23. A retainer according to claim 13, wherein said retainer is formed by bending a metal plate; wherein said first spring-receiving section of said retainer is located inside said frame structure and extends horizontally; and wherein said second spring-receiving section of said retainer is located outside said frame structure and bent into a substantially U-shape in cross-section.

24. A retainer according to claim 23, wherein said second axial portion of said second terminal is provided with an engaging axial portion extending laterally from a free end of said second axial portion, said engaging axial portion being engaged with an edge of said second spring-receiving section.

25. A connecting structure for coupling a zigzag spring to a frame structure for a seat cushion of a vehicle seat, said frame structure comprising:

a pair of spaced apart side frame members;

said side frame members having forward and rearward end portions;

a front frame member fixed to said forward end portions of said side frame members; and a connecting shaft extending between said rearward end portions of said side frame members and interconnecting said rearward end portions of said side frame members;

said zigzag spring having first and second terminals;

said first terminal being coupled to said front frame member;

said second terminal being formed into a substantially U-shape in outline and comprising first and second spaced apart axial portions and an intermediate axial portion interconnecting said first and second axial portions;

said connecting structure comprising a retainer;

said retainer comprising a substantially U-shaped body in cross-section, a first spring-receiving section extending laterally from one end of said U-shaped body, and a second spring-receiving section extending laterally from the other end of said U-shaped body;

said U-shaped body of said retainer being mounted on said connecting shaft with an opening thereof facing downward; and said zigzag spring being coupled at said second terminal thereof to said retainer with said first axial portion and said second axial portion being engaged with said first spring-receiving section of said retainer and said second spring-receiving section of said retainer, respectively, and with an intermediate axial portion thereof being located under said connecting shaft and contacted with said connecting shaft.

26. A connecting structure according to claim 25, wherein said U-shaped body of said retainer is mounted on said connecting shaft so as to be rotatable with respect to the connecting shaft.

27. A connecting structure according to claim 26, wherein said retainer is formed by bending a metal plate; wherein said first spring-receiving section of said retainer is located inside said frame structure and extends horizontally; and wherein said second spring-receiving section of said retainer is located outside said frame structure and bent into a substantially U-shape in cross-section.

28. A connecting structure according to claim 27, wherein said second axial portion of said second terminal is provided with an engaging axial portion extending laterally from a free end of said second axial portion, said engaging axial portion being engaged with an edge of said second spring-receiving section.

29. A connecting structure according to claim 27, wherein said vehicle seat includes a mechanism for causing said seat cushion to rise and fall in order to adjust a height of said vehicle seat.

30. A connecting structure according to claim 28, wherein said vehicle seat includes a mechanism for causing said seat cushion to rise and fall in order to adjust a height of said vehicle seat.

31. A connecting structure according to claim 29, wherein said mechanism comprises a pair of spaced apart base members mounted on a floor of a vehicle, linkage means provided between said side frame members and said base members, and actuating means for actuating said linkage means.

32. A connecting structure according to claim 30, wherein said mechanism comprises a pair of spaced apart base members mounted on a floor of a vehicle, linkage means provided between said side frame members and said base members, and actuating means for actuating said linkage means.

33. A connecting structure according to claim 25, wherein said retainer is formed by bending a metal plate; wherein said first spring-receiving section of said retainer is located inside said frame structure and extends horizontally; and wherein said second spring-receiving section of said retainer is located outside said frame structure and bent into a substantially U-shape in cross-section.

34. A connecting structure according to claim 33, wherein said second axial portion of said second terminal is provided with an engaging axial portion extending laterally from a free end of said second axial portion, said engaging axial portion being engaged with an edge of said second spring-receiving section.

35. A connecting structure according to claim 26, wherein said vehicle seat includes a mechanism for causing said seat cushion to rise and fall in order to adjust a height of said vehicle seat.

36. A connecting structure according to claim 35, wherein said mechanism comprises a pair of spaced apart base members mounted on a floor of a vehicle, linkage means provided between said side frame members and said base members, and actuating means for actuating said linkage means.

* * * * *